MARTHA M. CASHMAN.

Creeping-Robes for Infants.

No. 5,847. Reissued April 28, 1874.

Martha M. Cashman Inventor.

Witnesses

B. M. Williams.

C. H. Orr.

By her Attys

Henry A. Williams & Co.

AM. PHOTO-LITHOGRAPHIC Co. N.Y. (OSBORNE'S PROCESS.)

UNITED STATES PATENT OFFICE.

MARTHA M. CASHMAN, OF BOSTON, MASSACHUSETTS, ASSIGNOR TO OLIVIA P. FLYNT.

IMPROVEMENT IN CREEPING-ROBES FOR INFANTS.

Specification forming part of Letters Patent No. 70,801, dated November 12, 1867; reissue No. 5,847, dated April 28, 1874; application filed April 17, 1874.

*To all whom it may concern:*

Be it known that I, MARTHA M. CASHMAN, of Boston, in the county of Suffolk and State of Massachusetts, have invented certain new and useful Improvements in Children's Creeping-Robes and Protectors for Dresses; and I do hereby declare that the following is a full, clear, and exact description thereof, reference being had to the accompanying drawings and to the letters of reference marked thereon.

My invention is a garment intended to protect both the dress and underskirt, by inclosing them all in a garment which extends from the waist, within or under the skirt, downward, under, around, and up over the dress-skirt. The object of this garment, when worn by a young child, is to prevent its nicer garments from being soiled from creeping or any other cause. When worn by any one, old or young, its object is practically to prevent soiling of the nicer garments from any cause, such as dust, dirt, the weather, &c.

To enable others skilled in the art to make and use my invention, I will now proceed to describe its construction and use.

Figure 1:
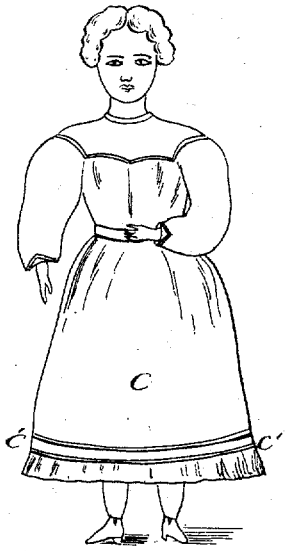
Figure 2:
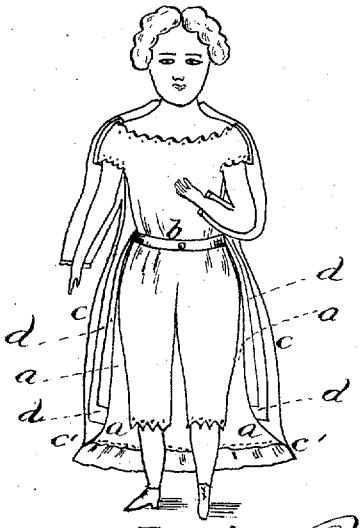
Figure 3:
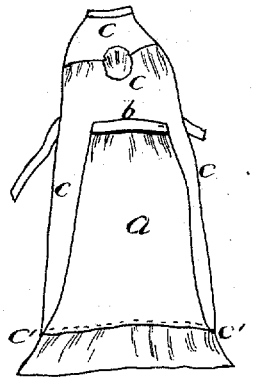

In the accompanying drawings, Figure 1 is a view showing the garment or creeping-robe as it appears upon a child. Fig. 2 is a vertical section, showing the dress and skirt inside the garment. Fig. 3 is a vertical section of the garment as it appears when removed.

Similar letters of reference indicate corresponding parts.

An inner skirt or lining, *a*, is made of any suitable material; is attached to the waist by the band *b*, or in any ordinary manner; and is placed inside the dress and other skirts *d*. An outer garment or wrapper, *c*, is placed over or outside the dress *d*, inclosing it, and is connected at its lower edge *c'* with the lower edge of the inner skirt or lining *a*. Thus these two garments *a c*, being attached at their lower edges, form one garment, and inclose the dress-skirt and other skirts *d*, so that no dirt, mud, or impurity can soil them. When used as a creeping-robe, it can be easily removed at any time, and the garments inclosed by it need not be rumpled or disturbed. The garment *c*, by itself considered, not being a new invention, any suitable outer garment of proper length—as, for example, an ordinary "water-proof"—may be substituted without necessarily making an entirely new garment or robe for the purpose. Of course, any material may be used which will be found practicable.

Having thus fully described my invention, what I claim, and desire to secure by Letters Patent, is—

The inner skirt or lining *a*, constructed as herein set forth, and attached at its lower edge to any ordinary outer garment or skirt *c*, substantially as and for the purposes above specified.

MARTHA M. CASHMAN.

Witnesses:
HENRY W. WILLIAMS,
M. A. COLLINS.